United States Patent
Yang et al.

(10) Patent No.: US 11,398,944 B2
(45) Date of Patent: Jul. 26, 2022

(54) VEHICLE FAULT HANDLING METHOD, APPARATUS, DEVICE AND STORAGE MEDIUM

(71) Applicant: Baidu Online Network Technology (Beijing) Co., Ltd., Beijing (CN)

(72) Inventors: Kai Yang, Beijing (CN); Lei Zhang, Beijing (CN); Hongda Zhang, Beijing (CN); Qijuan Yin, Beijing (CN); Wuzhao Zhang, Beijing (CN); Xiaoyan Wang, Beijing (CN)

(73) Assignee: Apollo Intelligent Driving Technology (Beijing) Co., Ltd., Beijing (CN)

(*) Notice: Subject to any disclaimer, the term of this patent is extended or adjusted under 35 U.S.C. 154(b) by 417 days.

(21) Appl. No.: 16/459,653

(22) Filed: Jul. 2, 2019

(65) Prior Publication Data
US 2020/0076676 A1    Mar. 5, 2020

(30) Foreign Application Priority Data
Aug. 30, 2018 (CN) .......................... 201811002880.0

(51) Int. Cl.
*H04L 41/0631* (2022.01)
*B60W 50/02* (2012.01)
(Continued)

(52) U.S. Cl.
CPC ...... *H04L 41/0631* (2013.01); *B60R 16/0232* (2013.01); *B60W 50/023* (2013.01);
(Continued)

(58) Field of Classification Search
CPC ............ H04L 41/0631; H04L 41/0618; H04L 41/0654; H04L 43/10; G05B 23/0221;
(Continued)

(56) References Cited

U.S. PATENT DOCUMENTS 11,025,483 B1* 6/2021 Hashmi ............... H04L 63/0272
2014/0277608 A1* 9/2014 Debouk .............. B60W 50/023
700/79

(Continued)

FOREIGN PATENT DOCUMENTS

CN        1906061 A      1/2007
CN      204330354 U      5/2015
(Continued)

OTHER PUBLICATIONS

Zhang Jun "Research of Engine Fault Detection Algorithm of Intelligent Unmanned Vehicle", Bulletin of Science and Technology, 2015, pp. 166-168, vol. 31—Issue: 4.

*Primary Examiner* — Austin J Moreau
(74) *Attorney, Agent, or Firm* — Harness, Dickey & Pierce, P.L.C.

(57) ABSTRACT

The present application provides a vehicle fault handling method, an apparatus and a storage medium, the method includes: acquiring in real-time, by a first vehicle fault handling device, status information of a second vehicle fault handling device, where the first vehicle fault handling device is further configured to monitor a main system of a vehicle in real-time, the second vehicle fault handling device is configured to monitor a first computing device, and the first vehicle fault handling device and the main system are provided in the first computing device; determining, by the first vehicle fault handling device, whether a fault has occurred in the second vehicle fault handling device according to the status information thereof; and performing, by the first vehicle fault handling device, fault handling if a fault has occurred in the second vehicle fault handling device.

7 Claims, 4 Drawing Sheets

(51) Int. Cl.
*H04L 41/0604* (2022.01)
*H04L 41/0654* (2022.01)
*H04L 43/10* (2022.01)
*B60R 16/023* (2006.01)
*G07C 5/08* (2006.01)
*B60W 50/023* (2012.01)
*G07C 5/00* (2006.01)

(52) U.S. Cl.
CPC ......... *B60W 50/0205* (2013.01); *G07C 5/008* (2013.01); *G07C 5/0808* (2013.01); *G07C 5/0816* (2013.01); *H04L 41/0618* (2013.01); *H04L 41/0654* (2013.01); *H04L 43/10* (2013.01)

(58) Field of Classification Search
CPC .... G07C 5/008; G07C 5/0808; G07C 5/0816; B60W 50/023; B60W 50/0205; B60R 16/0232
See application file for complete search history.

(56) References Cited

U.S. PATENT DOCUMENTS

| | | | | |
|---|---|---|---|---|
| 2020/0010061 | A1* | 1/2020 | Tiwari | F16K 5/18 |
| 2020/0331493 | A1* | 10/2020 | Wu | B60W 60/00186 |

FOREIGN PATENT DOCUMENTS

| | | | | |
|---|---|---|---|---|
| CN | 105365712 | A | | 3/2016 |
| CN | 106043309 | A | | 10/2016 |
| CN | 107885184 | A | | 4/2018 |
| CN | 107908186 | B | * | 4/2018 |
| CN | 108139756 | A | | 6/2018 |
| CN | 108196547 | A | | 6/2018 |
| JP | 6020569 | B2 | | 11/2016 |
| WO | WO-2018233644 | A1 | * | 12/2018 ............. H04L 12/40 |

* cited by examiner

VEHICLE FAULT HANDLING METHOD, APPARATUS, DEVICE AND STORAGE MEDIUM

CROSS-REFERENCE TO RELATED APPLICATIONS

The present disclosure claims priority to Chinese application number 201811002880.0, filed on Aug. 30, 2018, which is incorporated by reference in its entirety.

TECHNICAL FIELD

The present application relates to the technical field of unmanned driving and, in particular, to a vehicle fault handling method, an apparatus, a device and a storage medium.

BACKGROUND

An unmanned vehicle is a new type of smart automobile, which primarily operates through an electronic control unit (ECU) to exercise accurate control and computational analysis over various components of the vehicle to realize full automation in the vehicle, achieving the purpose of unmanned driving of the vehicle.

In an unmanned system, unforeseeable safety hazard may be incurred if an unmanned vehicle continues to run when failure has occurred in its system software and/or hardware and timely data transfer has become impossible.

SUMMARY

The present application provides a vehicle fault handling method, an apparatus, a device and a storage medium to address defects in prior art vehicle, such as low safety.

A first aspect of the present application provides a vehicle fault handling method, including:

acquiring in real-time, by a first vehicle fault handling device, status information of a second vehicle fault handling device, where the first vehicle fault handling device is further configured to monitor a main system of a vehicle in real-time, the second vehicle fault handling device is configured to monitor a first computing device, and the first vehicle fault handling device and the main system are provided in the first computing device;

determining, by the first vehicle fault handling device, whether a fault has occurred in the second vehicle fault handling device according to the status information of the second vehicle fault handling device; and performing, by the first vehicle fault handling device, fault handling if a fault has occurred in the second vehicle fault handling device.

A second aspect of the present application provides a vehicle fault handling method, including:

acquiring in real-time, by a second vehicle fault handling device, status information of a first computing device, where the second vehicle fault handling device is further configured to monitor a second computing device in real-time, where the second vehicle fault handling device is provided in the second computing device;

determining, by the second vehicle fault handling device, whether a fault has occurred in the first computing device according to the status information of the first computing device; and controlling, by the second vehicle fault handling device, a driving status of the vehicle if a fault has occurred in the first computing device.

A third aspect of the present application provides a vehicle fault handling apparatus, including:

a first acquiring module, configured for a first vehicle fault handling device to acquire in real-time status information of a second vehicle fault handling device, monitor a main system of a vehicle in real-time, the second vehicle fault handling device is configured to monitor a first computing device, and the first vehicle fault handling device and the main system are provided in the first computing device;

a first determining module, configured for the first vehicle fault handling device to determine whether a fault has occurred in the second vehicle fault handling device according to the status information of the second vehicle fault handling device; and a first handling module, configured for the first vehicle fault handling device to perform fault handling if a fault has occurred in the second vehicle fault handling device.

A fourth aspect of the present application provides a vehicle fault handling apparatus, including:

a second acquiring module, configured for a second vehicle fault handling device to acquire in real-time status information of a first computing device, monitor a second computing device in real-time, where the second vehicle fault handling device is provided in the second computing device;

a second determining module, configured for the second vehicle fault handling device to determine whether a fault has occurred in the first computing device according to the status information of the first computing device; and a second handling module, configured for the second vehicle fault handling device to control a driving status of the vehicle if a fault has occurred in the first computing device.

A fifth aspect of the present application provides a vehicle fault handling device, including at least one processor and a memory, where:

the memory stores thereon computer program which is executed by the at least one processor to implement the method provided in the first aspect.

A sixth aspect of the present application provides a vehicle fault handling device, including at least one processor and a memory, where:

the memory stores thereon computer program which is executed by the at least one processor to implement the method provided in the second aspect.

A seventh aspect of the present application provides a computer readable storage medium, storing thereon a computer program which, when executed, implements the method provided in the first aspect.

An eighth aspect of the present application provides a computer readable storage medium, storing thereon a computer program which, when executed, implements the method provided in the second aspect.

According to the vehicle fault handling method, apparatus and storage medium provided in the present application, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system, and improving the safety for the unmanned vehicle.

BRIEF DESCRIPTION OF THE DRAWINGS

In order to more clearly illustrate the embodiments of the present application or the technical solutions in the prior art, the drawings required in describing the embodiments or the prior art will be briefly introduced below. Apparently, the drawings described in the following are for some embodiments of the present application, and other drawings can be obtained by those skilled in the art without paying any creative labor.

Specific embodiments of the present application have been shown by the drawings, which will be described in more detail later. The drawings and the textual descriptions are by no means intended to limit the scope of the present application. Rather, they aim at explaining the disclosed concepts to those skilled by making reference to specific embodiments.

DETAILED DESCRIPTION OF THE EMBODIMENTS

In order to make objectives, technical solutions and advantages of embodiments of the present application clearer, the technical solutions in the embodiments of the present application will be described hereunder clearly and comprehensively with reference to accompanying drawings. Obviously, the described embodiments are only a part of embodiments of the present application, rather than all of them. Based on the embodiments of the present application, all other embodiments obtained by persons of ordinary skill in the art without making any creative effort shall fall within the protection scope of the present application.

Firstly, some of the terminologies involved in the present application are explained.

Computing device: a device capable of computational processing, which may be an industrial personal computer (IPC), a general term referring to tools that use bus architecture and offer testing and controlling to manufacturing processes, machines, electrical devices and processing devices. The IPC has essential computer features and characteristics. For instance, an IPC may have a computer mainboard, a CPU, a hard drive, a memory, a peripheral device, an interface, as well as an operating system, a control network, a protocol, computational capacity, and a friendly human-machine interface. Products and technologies in the IPC sector are highly specialized. They may be categorized as intermediate products designed to provide various sectors with industrial computers that are stable, reliable, embedded, and smart. In an unmanned vehicle, the IPC, which may be referred to as a vehicle terminal, serves as a tool for testing and controlling various aspects of the vehicle. The IPC may also be some other computing device usable in a vehicle, which will not be specifically limited herein.

Main system: the main system of a computing device (e.g., an IPC) of an unmanned vehicle, which is responsible for collecting, planning and controlling of sensory data of the vehicle for realizing autopilot.

Figure 1:
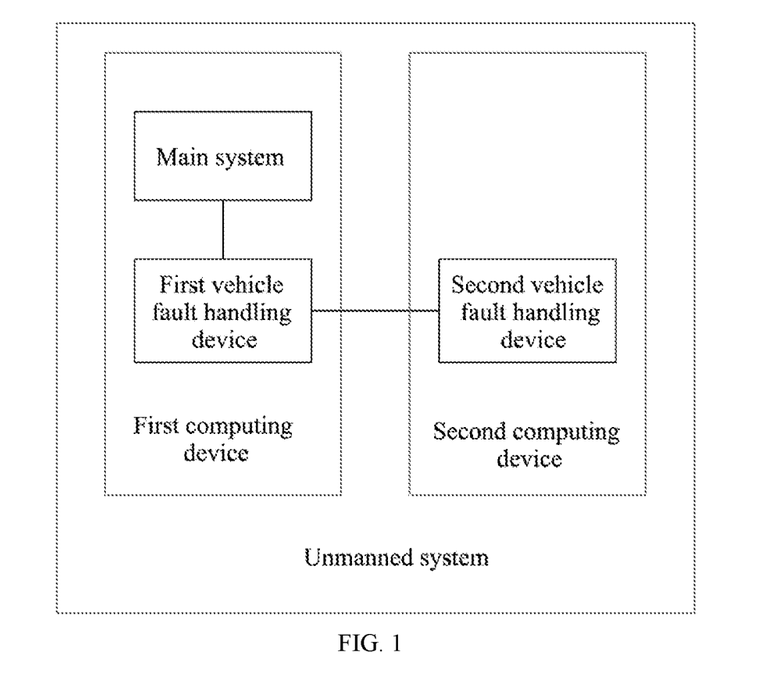
FIG. 1 is a structural diagram illustrating an unmanned system to which an embodiment of the present application is applicable.

The vehicle fault handling method as provided in the embodiment of the present application is applicable to the following unmanned systems, as shown in FIG. 1, which is a structural diagram illustrating an unmanned system to which an embodiment of the present application is applicable. The unmanned system includes a first computing device, which in turn includes a functional safety subsystem (i.e., a first vehicle fault handling device). The system may further include a main system. Thus, a functional safety subsystem may be built on the same hardware (e.g., the first computing device or IPC) as the main system for monitoring the main system in order to realize discovery and callback of vehicle faults. The first vehicle fault handling device may be the very first computing device. If distinction from the main system is to be made, one may believe that the first vehicle fault handling device and the main system are provided on the first computing device. Additionally, a redundant second vehicle fault handling device is provided in the unmanned system. The second vehicle fault handling device may itself be a second computing device. Alternatively, one may believe that the second vehicle fault handling device is provided in the second computing device. The first and second vehicle fault handling device monitor each other, while the first and second vehicle fault handling device monitors the main system in real-time, which may effectively enhance the robustness for the unmanned system. It may be understood that the vehicle fault handling method as provided in the embodiment of the present application may also be used in other functional systems similar to unmanned driving, and is not limited to being used in the unmanned system.

In addition, the terms "first" and "second" or the like are used for descriptive purposes only and are not to be construed as indicating or implying a relative importance or implicitly indicating the number of technical features being indicated. In the descriptions of the various embodiments that follow, "plurality of" means two or more, unless explicitly specified otherwise.

The following specific embodiments may be recombined with each other, and the same or similar concepts or processes may not be repeated in some embodiments. Now, embodiments of the present application will be described with reference to the accompanying drawings.

Embodiment 1

The present embodiment provides a vehicle fault handling method for handling a fault in an unmanned vehicle. The main entity for implementing this embodiment is a vehicle fault handling apparatus, which may be provided in a first computing device of the vehicle and, specifically, in a first vehicle fault handling device.

Figure 2:
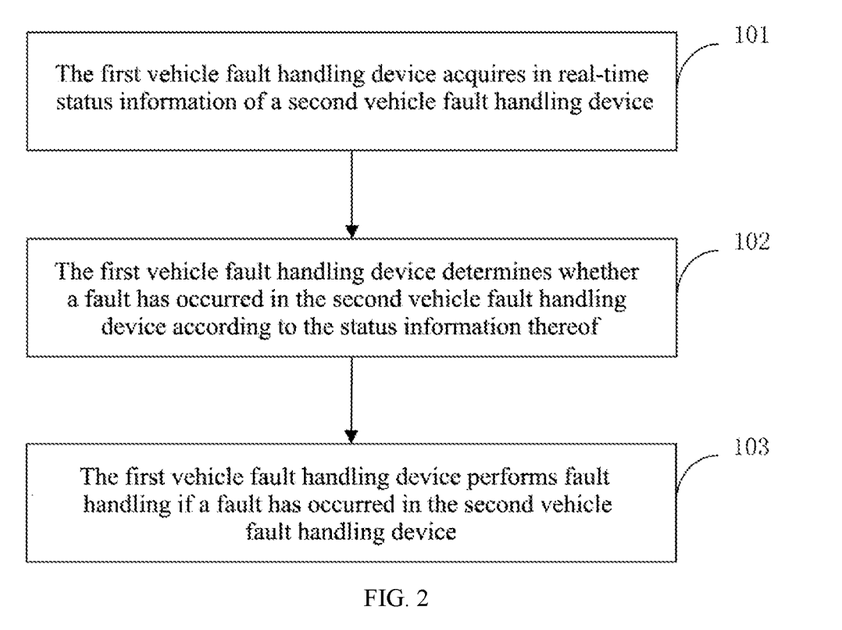
FIG. 2 is a flowchart illustrating a vehicle fault handling method provided in an embodiment of the present application.

As shown in FIG. 2, which is a flowchart illustrating a vehicle fault handling method provided in an embodiment of the present application, the method includes:

Step 101, the first vehicle fault handling device acquires in real-time status information of a second vehicle fault handling device.

The first vehicle fault handling device is further configured to monitor a main system of the vehicle in real-time, the second vehicle fault handling device is configured to monitor a first computing device, and the first vehicle fault handling device and the main system are provided in the first computing device.

Step 102, the first vehicle fault handling device determines whether a fault has occurred in the second vehicle fault handling device according to the status information of the second vehicle fault handling device.

Step 103, the first vehicle fault handling device performs fault handling if a fault has occurred in the second vehicle fault handling device.

Specifically, the first vehicle fault handling device is created on the first computing device, in which the main system of the unmanned vehicle resides, to monitor the status of the main system in real-time, so as to timely discover and callback faults. Additionally, a redundant second vehicle fault handling device is provided in the unmanned vehicle. The second vehicle fault handling device may itself be a computing device, which may be referred to as a second computing device. Alternatively, one may believe that the second vehicle fault handling device is provided in the second computing device. The first and second vehicle fault handling device monitor each other, while the first and second vehicle fault handling device monitors the main system in real-time, which may effectively enhance the robustness for the unmanned system.

The first vehicle fault handling device monitors the main system of the vehicle in real-time. Additionally, the first vehicle fault handling device may also acquire in real-time status information of the second vehicle fault handling device, which may specifically be heartbeat detecting information, environment information and/or the like of the second vehicle fault handling device. The environment information may be CPU usage, memory usage, etc., of the second vehicle fault handling device. Of course, some other information may also be included as required, the particulars of which may be configured as required, which will not be limited in this embodiment.

Here, the status information of the second vehicle fault handling device is referring to the status information of the second computing device.

Having acquired the status information of the second computing device, the first vehicle fault handling device may accordingly determine whether a fault has occurred in the second vehicle fault handling device, such as whether the heartbeat detecting information may be received from the second vehicle fault handling device as usual, or whether the CPU usage of the second vehicle fault handling device is over a predefined threshold.

When a determination is made that a fault has occurred in the second vehicle fault handling device according to the status information thereof, the first vehicle fault handling device performs fault handling, such as alerting to remind relevant personnel to handle the situation, or controlling the vehicle to decelerate, stop or the like. The specific handling measure may be configured as required.

Additionally, the second vehicle fault handling device may also monitor the first computing device for faults in real-time. The monitoring may be done via, e.g., heartbeat mechanism, so that when a fault has occurred in the first computing device, the second vehicle fault handling device may promptly control a driving status, such as deceleration, stopping, steering or the like, of the vehicle, advancing the safety of the vehicle.

For the approach where the first vehicle fault handling device monitors the main system in real-time, the first vehicle fault handling device may acquire in real-time first data information of the main system. The first vehicle fault handling device determines whether a fault has occurred in the main system according to the first data information; and the first vehicle fault handling device controls the vehicle to decelerate or stop if a fault has occurred in the main system. The first data information may include at least one of frequency information, latency information, heartbeat detecting information, collision detecting information, chassis acquisition information, assisted autopilot process information, security gateway monitoring information, first computing device environment information.

The first data information may be data information associated with any layer or node in the main system. For instance, a main system may be divided into three layers, i.e., perception, planning and controlling. The perception refers to the capability of the unmanned system in collecting information from its environment and extracting therefrom relevant knowledge. Environmental perception specifically refers to the ability to understand a scenario in an environment, e.g., the location of an obstacle, detecting a road sign/marking, detecting a pedestrian or vehicle, or other semantic categorization of data. Generally speaking, localization is also part of perception because it is the ability of the unmanned car to determine its location relative to the environment. Planning refers to the process of an unmanned car in making a purposeful decision for an objective. For an unmanned vehicle, the objective is often about starting from a place of departure to a destination while dodging obstacles as well as optimizing driving course and behavior to ensure the safety and comfort of its passenger. A planning layer may often be sub-divided into mission planning, behavioral planning and motion planning. Controlling is the ability of an unmanned vehicle to accurately carry out a planned motion, where the motion originates from a higher layer. A layer may involve transfer of various types of data, and the normal and correct transfer of the data is a key foundation for an unmanned vehicle to go fully autopilot. Accordingly, the first vehicle fault handling device may acquire in real-time first data information about the foregoing data.

The first vehicle fault handling device may acquire the first data information of the main system in various ways. One way could be that various data procedures in the main system actively transmit, while operating, relevant data to the first vehicle fault handling device. Alternatively, one way could be that the first vehicle fault handling device queries in real-time a master control system for data information, and the specifics of which will not be limited herein. In a word, the first vehicle fault handling device has access to various data information of the main system.

Illustratively, the first vehicle fault handling device may acquire the foregoing data information from an onboard ECU, the onboard ECU being capable of collecting signals from various sensor on the vehicle and generating a controlling signal according to the collected signals. The first vehicle fault handling device may be connected to the ECU via a wire or wirelessly, transmit to the ECU data acquiring request, and receive data information transmitted from the ECU. The first vehicle fault handling device may also be communicatively connected to various sensors in the vehicle. The data information of the main system may be acquired in the following manner: acquiring information detected by a sensor associated with a data flow of the main system. The sensor may be related to collision detection, chassis acquisition, security gateway monitoring, IPC environment or the like. The sensor may include an image sensor, a dynamics sensor, a speed sensor, an acceleration sensor, a thermo sensor, a range sensor or the like. The first vehicle fault handling device may also make agreements with the main system regarding which of the data flow, or information related to the data flow, etc., need to be transmitted to the first vehicle fault handling device during the course of perception data collection, planning and controlling by the main system. In a word, the specific way of the acquisition may be configured as needed, which will not be elaborated herein.

Having acquired the first data information of the main system, the first vehicle fault handling device determines whether a fault has occurred in the main system according to the first data information; and the first vehicle fault handling device controls the driving status of the vehicle if a fault has occurred in the main system. For instance, the vehicle may be controlled to stop, decelerate, keep to a side, or pull over.

It should be noted that the first vehicle fault handling device had been empowered with control over the vehicle when being built, which may be pre-configured in a profile.

In an embodiment, for various types of first data information thus acquired, a predefined condition, e.g., a reference range, may be pre-configured for individual types of the first data information, such that when specific first data information fails to fulfill its associated predefined condition, one may consider that a fault has occurred in the main system.

In an embodiment, associated fault types may also be pre-configured for different types of first data information, for which different troubleshooting measures, e.g., determining whether to stop, decelerate or steer, may be configured. The particulars may be configured as required.

According to the vehicle fault handling method provided in this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle.

Embodiment 2

The present embodiment provides supplementary explanation for the method provided in Embodiment 1.

As a potential implementation, on the basis of the Embodiment 1, in an embodiment, Step 103 may specifically include: when a fault has occurred in the second vehicle fault handling device, the first vehicle fault handling device performs fault handling to inform relevant personnel to handle the situation. Alternatively, the first vehicle fault handling device may also be capable of handling measures such as controlling the vehicle to decelerate, stop, steer or the like.

In an embodiment, the status information of the second vehicle fault handling device includes heartbeat detecting information for the second vehicle fault handling device, and Step 102 may specifically include:

determine that a fault has occurred in the second vehicle fault handling device if the first vehicle fault handling device fails to acquire the heartbeat detecting information for the second vehicle fault handling device within a first preset time period.

The first preset time period is a predefined timing threshold for the heartbeat detection.

In an embodiment, the status information of the second vehicle fault handling device further includes environment information for the second vehicle fault handling device; and the first vehicle fault handling device determines whether a fault has occurred in the second vehicle fault handling device according to the status information of the second vehicle fault handling device includes:

the first vehicle fault handling device determines whether a fault has occurred in the second vehicle fault handling device according to the environment information thereof if the first vehicle fault handling device determines that no fault has occurred in the second vehicle fault handling device according to the heartbeat detecting information thereof.

As another potential implementation, on the basis of the above embodiment, in an embodiment, the first vehicle fault handling device monitors a main system of the vehicle in real-time includes:

Step A, the first vehicle fault handling device acquires in real-time first data information of the main system.

Step B, the first vehicle fault handling device determines whether a fault has occurred in the main system according to the first data information.

Step C, the first vehicle fault handling device controls the vehicle to decelerate or stop if a fault has occurred in the main system.

In an embodiment, the first data information may include at least one of frequency information, latency information, heartbeat detecting information, collision detecting information, chassis acquisition information, assisted autopilot process information, security gateway monitoring information, first computing device environment information. The first computing device environment information may also include CPU usage, memory usage, etc., of the first computing device. The specific type of first data information available may be configured as required.

The first vehicle fault handling device determines whether a fault has occurred in the main system according to the first data information includes: determining that a fault has occurred in the main system if at least one of the first data information fails to fulfill a corresponding preset reference range.

Specifically, frequency information may refer to transmission frequency of a data flow in the main system. For instance, there may be a data flow transmission at a transmission frequency of 10 HZ from the perception layer to the planning layer. There may also be a data flow transmission at some transmission frequency from the planning layer to the controlling layer. Latency information may refer to information about the latency of a data flow in the main system, such as the latency in the main system from spotting an obstacle to issuing a command to dodge the obstacle. Heartbeat detecting information may be, e.g., detecting whether a process is online. Collision detecting information may be about detecting information about the presence of an obstacle around the vehicle that tend to cause collision. The specific contents of the various types of data information may be configured as required, which will not be limited in this embodiment.

In an embodiment, the first vehicle fault handling device may determine whether the first data information fulfills its corresponding predefined reference range and, if yes, determine that no fault has occurred in the main system; if not, determine that a fault has occurred in the main system.

Specifically, a predefined reference range may be preconfigured for individual types of the first data information. Having acquired the first data information, the first data information may be compared with its predefined reference range and, if all first data information fulfill their predefined reference range, a determination may be made that no fault has occurred in the main system. If, however, any one or more of the first data information fails to fulfill its/their predefined reference range, a determination may be made that a fault has occurred in the main system.

Illustratively, first vehicle fault handling device may compared the first data information with the upper and lower bounds of its predefined reference range. If the first data information is about the upper bound or below the lower bound of the predefined reference range, a determination may be made that the first data information does not fulfill its corresponding predefined reference range. If, however, the first data information is below the upper bound and above the lower bound of the predefined reference range, a determination may be made that the first data information fulfills its corresponding predefined reference range. As used herein, the predefined reference range may alternatively be a threshold. For instance, when the acquired first data information is above the threshold, the range is fulfilled, and/or when it is below the threshold, the range is not fulfilled. The specific form will not be limited hereto.

Illustratively, frequency information is associated with a predefined reference range of 10-15 HZ. Now the acquired frequency information reads 5 HZ, which does not fall into the predefined reference range, and hence the main system may be considered to be experiencing fault. For instance, latency information is associated with a predefined reference range of less than 400 milli-seconds (ms). Now the acquired latency information reads 800 ms, and hence the main system may be considered to be experiencing fault.

In an embodiment, the acquired first data information may also be indirectly derived by the first vehicle fault handling device according to other acquired data information, such as by way of some computational processing. The specific means for the acquisition will not be limited herein.

In an embodiment, if a fault has occurred in the main system, the first vehicle fault handling device may control the vehicle to stop or decelerate.

Specifically, if a determination has been made that a fault has occurred in the main system, that is, the data flow of the main system cannot be transferred as expected, which tends to leave the controlling layer of the vehicle unable to receive commands from its upper layers, causing the vehicle to continue driving on, which can create a critical safety hazard. Thus, the first vehicle fault handling device may timely control the vehicle to decelerate or stop. It may also control the vehicle to pull over or go to a parking lot. The specific strategy for the controlling may be configured according to the particulars of the fault.

Further, the first vehicle fault handling device may transmit a braking command to a braking system of the vehicle, causing the braking system to engage in decelerating or stopping procedures in response to the braking command. Alternatively, a parking command may be transmitted to a parking system to commence parking procedures. Other fault handling measures may also be provided as needed, which will not be elaborated herein.

Specifically, a configuration may be made in a profile to empower the first vehicle fault handling device with control over the vehicle, so that the first vehicle fault handling device may, having determined that a fault has occurred in the main system, timely take control of the vehicle by, e.g., transmitting a braking command to a braking system to proactively decelerate or stop the vehicle.

In an embodiment, the first vehicle fault handling device may also determine the driving direction of the vehicle according to various first data information that have been acquired; combine the direction with collision detecting information, chassis acquisition information and/or the like to make analysis and decide on whether to steer away the vehicle and, if yes, control the vehicle to make a turn; and/or control the vehicle to pull over and stop when decelerating or stopping the vehicle, the particulars of which may be configured as required.

In an embodiment, when a fault has occurred in the main system, the method may further include:

The first vehicle fault handling device performs alert handling.

Specifically, having determined that a fault has occurred in the main system, the first vehicle fault handling device may, on one hand, take control of the driving status of the vehicle, and on the other hand, alert relevant personnel, such as a passenger, an administrator, a vehicle maintenance personnel, etc.

The specific form of alerting may be done by sound, a display on a screen in the vehicle, or a transmission to a remote control server of the vehicle, the particulars of which will not be limited herein.

Illustratively, a warning tone may be made to prompt a passenger in the vehicle to take relevant safety measures, or to alert other vehicles around to keep distance, or to remind testers/administrators outside of the vehicle to commence servicing, etc.

It should be noted that various potential implementations of this embodiment may be exercised separately or, if without contradiction, in any combination, which will not be limited in the present application.

According to the vehicle fault handling method provided in this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle. Moreover, a warning may be provided to timely remind relevant personnel to take safety measures, furthering the safety for the vehicle.

Embodiment 3

The present embodiment provides a vehicle fault handling method for handling a fault in an unmanned vehicle. The main entity for implementing this embodiment is a vehicle fault handling apparatus, which may be provided in a second computing device of the vehicle and, specifically, in a second vehicle fault handling device.

Figure 3:
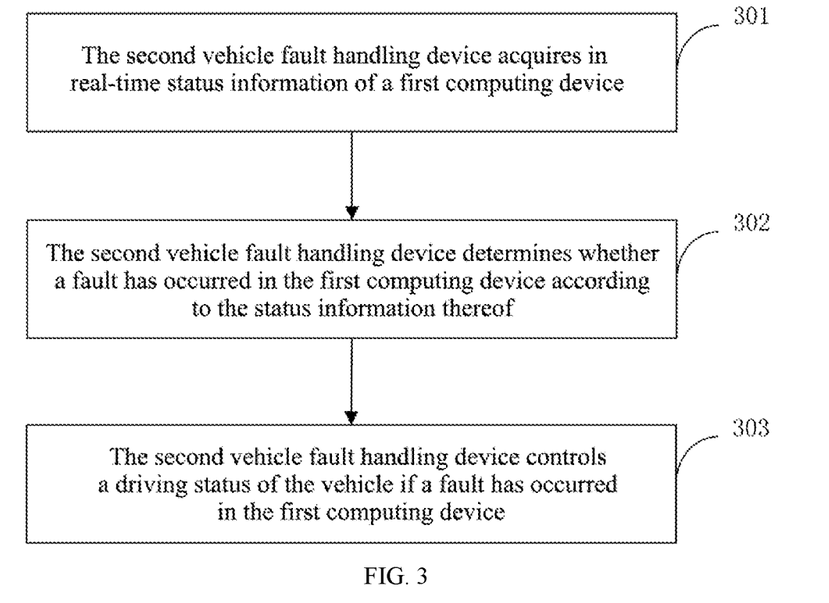
FIG. 3 is a flowchart illustrating a vehicle fault handling method provided in another embodiment of the present application.

As shown in FIG. 3, which is a flowchart illustrating a vehicle fault handling method provided in an embodiment of the present application, the method includes:

Step 301, the second vehicle fault handling device acquires in real-time status information of a first computing device.

The second vehicle fault handling device is further configured to monitor a second computing device in real-time, where the second vehicle fault handling device is provided on the second computing device.

Step 302, the second vehicle fault handling device determines whether a fault has occurred in the first computing device according to the status information thereof.

Step 303, the second vehicle fault handling device controls a driving status of the vehicle if a fault has occurred in the first computing device.

It should be noted that the second vehicle fault handling device executes the foregoing steps in the same or similar way as the first vehicle fault handling device monitoring the second vehicle fault handling device. That is, the two monitor each other, and none of which will be repeated herein. The distinction lies in that the first vehicle fault handling device also monitors in real-time for a fault in the main system of the vehicle, the specific operations of which conforms with the foregoing embodiments, which will not be repeated herein, either.

The second vehicle fault handling device also monitors the second computing device in real-time, primarily on heartbeat detecting information, environment information and some other relevant information about the second computing device. The status information which has been acquired by the second vehicle fault handling device about the second computing device may be transmitted to the first vehicle fault handling device, so as to cause the first vehicle fault handling device to monitor the second computing device. The second vehicle fault handling device may also make a determination by itself and perform associated handling. For instance, the second vehicle fault handling device may begin from CPU usage and/or memory usage of the second computing device to determine whether any fault has occurred in the second computing device. As used herein, the "fault" means the second computing device may be considered to be malfunctioning as soon as its relevant information is beyond a threshold, e.g., its CPU usage and/or memory usage is/are above a predefined threshold, which will not be specifically limited herein.

According to the vehicle fault handling method provided in this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant second computing device is provided on the vehicle, and a redundant vehicle fault handling device is built on the second computing device, so as to discover and callback faults. Moreover, the two vehicle fault handling devices may monitor each other, enhancing the robustness of the unmanned system while improving the safety for the unmanned vehicle.

Embodiment 4

The present embodiment provides supplementary explanation for the method provided in Embodiment 3.

As a potential implementation, on the basis of the above embodiment, in an embodiment, the second vehicle fault handling device controls a driving status of the vehicle if a fault has occurred in the first computing device includes:

the second vehicle fault handling device controls the vehicle to decelerate, stop or emergency brake if a fault has occurred in the first computing device.

In an embodiment, the status information of the first computing device includes heartbeat detecting information for the first computing device, and the second vehicle fault handling device determines whether a fault has occurred in the first computing device according to the status information thereof includes:

determine that a fault has occurred in the first computing device if the second vehicle fault handling device fails to acquire the heartbeat detecting information for the first computing device within a second preset time period.

As another potential implementation, on the basis of the above embodiment, in an embodiment, the method may further include: the second vehicle fault handling device performs alert handling if a fault has occurred in the first computing device.

As yet another potential implementation, on the basis of the above embodiment, in an embodiment, the second vehicle fault handling device monitors a second computing device of the vehicle in real-time includes:

Step D, the second vehicle fault handling device acquires in real-time heartbeat detecting information and environment information for the second computing device.

Step E, the second vehicle fault handling device transmits the heartbeat detecting information and the environment information for the second computing device to a first vehicle fault handling device, and determines whether a fault has occurred in the second computing device according to the heartbeat detecting information and the environment information for the second computing device.

Step F, the second vehicle fault handling device performs alert handling if a fault has occurred in the second computing device.

Specifically, the second vehicle fault handling device also monitors the second computing device in real-time, primarily on heartbeat detecting information, environment information and some other relevant information about the second computing device. The status information which has been acquired by the second vehicle fault handling device about the second computing device may be transmitted to the first vehicle fault handling device, so as to cause the first vehicle fault handling device to monitor the second computing device. The second vehicle fault handling device may also make a determination by itself and perform associated handling. For instance, the second vehicle fault handling device may begin from CPU usage and/or memory usage of the second computing device to determine whether any fault has occurred in the second computing device. As used herein, the "fault" means the second computing device may be considered to be malfunctioning as soon as its relevant information is beyond a threshold, e.g., its CPU usage and/or memory usage is/are above a predefined threshold, which will not be specifically limited herein.

In embodiments of the present application, the first vehicle fault handling device acts as the primary monitoring device that has relatively more privileges on controlling the vehicle, even the entirety of the vehicle. Rather than just limited to monitoring the second vehicle fault handling device (or the second computing device), the first vehicle fault handling device also takes charge in monitoring the main system, which is of critical importance. As a redundancy monitoring device, the second vehicle fault handling device has control over part of the vehicle, the specific privileges of which may be pre-configured in a profile.

It should be noted that the second vehicle fault handling device executes the foregoing steps in the same or similar way as the first vehicle fault handling device monitoring the second vehicle fault handling device. That is, the two monitor each other, and none of which will be repeated herein.

It should be noted that various potential implementations of this embodiment may be exercised separately or, if without contradiction, in any combination, which will not be limited in the present application.

According to the vehicle fault handling method provided in this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle. Moreover, a warning may be provided to timely remind relevant personnel to take safety measures, furthering the safety for the vehicle.

Embodiment 5

The present embodiment provides a vehicle fault handling apparatus configured to implement the method according to the Embodiment 1.

Figure 4:
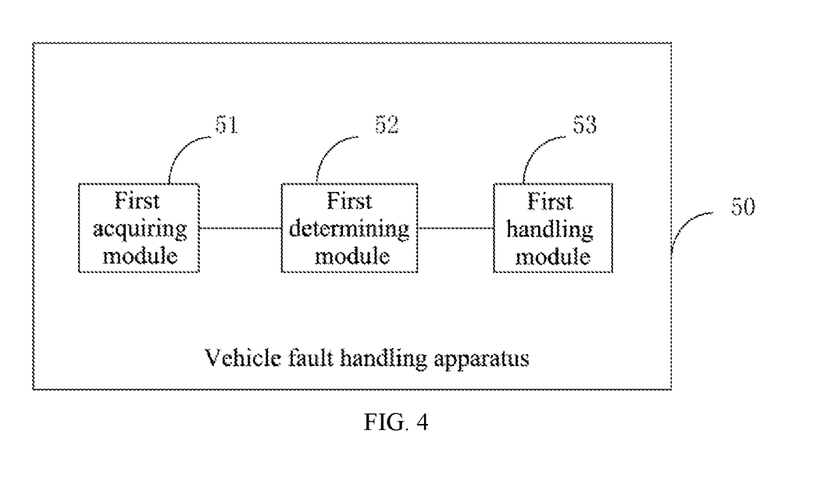
FIG. 4 is a structural diagram illustrating a vehicle fault handling apparatus provided in an embodiment of the present application.

FIG. 4 shows a structural diagram illustrating a vehicle fault handling apparatus provided in an embodiment of the present application. The vehicle fault handling apparatus 50 includes a first acquiring module 51, a first handling module 52 and a first handling module 53.

The first acquiring module 51 is configured for a first vehicle fault handling device to acquire in real-time status information of a second vehicle fault handling device, monitor a main system of the vehicle in real-time, the second vehicle fault handling device is configured to monitor a first computing device, and the first vehicle fault handling device and the main system are provided in the first computing device. The first determining module 52 is configured for the first vehicle fault handling device to determine whether a fault has occurred in the second vehicle fault handling device according to the status information thereof. The first handling module 53 is configured for the first vehicle fault handling device to perform fault handling if a fault has occurred in the second vehicle fault handling device.

With regard to the apparatus in this embodiment, the specific ways for the various modules to implement the operations have been detailed in the embodiments about the method, which will not be elaborated herein.

According to the vehicle fault handling apparatus provided in this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle.

Embodiment 6

This embodiment provides supplementary explanation for the apparatus provided in Embodiment 5, aiming at implementing the method provided in Embodiment 2.

As a potential implementation, on the basis of the Embodiment 5, in an embodiment, the first handling module is specifically configured for the first vehicle fault handling device to perform alert handling if a fault has occurred in the second vehicle fault handling device.

In an embodiment, the status information of the second vehicle fault handling device includes heartbeat detecting information for the second vehicle fault handling device, and the first determining module is specifically configured to:

determine that a fault has occurred in the second vehicle fault handling device if the first vehicle fault handling device fails to acquire the heartbeat detecting information for the second vehicle fault handling device within a first preset time period.

In an embodiment, the status information of the second vehicle fault handling device further includes environment information for the second vehicle fault handling device, and the first determining module is further configured for:

the first vehicle fault handling device determines whether a fault has occurred in the second vehicle fault handling device according to the environment information thereof if the first vehicle fault handling device determines that no fault has occurred in the second vehicle fault handling device according to the heartbeat detecting information thereof.

As another potential implementation, on the basis of the Embodiment 5, in an embodiment, the first acquiring module is further configured for the first vehicle fault handling device to acquire in real-time first data information of the main system.

The first determining module is further configured for the first vehicle fault handling device to determine whether a fault has occurred in the main system according to the first data information. The first handling module is further configured for the first vehicle fault handling device to control the vehicle to decelerate or stop if a fault has occurred in the main system.

In an embodiment, the first data information may include at least one of frequency information, latency information, heartbeat detecting information, collision detecting information, chassis acquisition information, assisted autopilot process information, security gateway monitoring information, first computing device environment information, and the first determining module is specifically configured to:

determine that a fault has occurred in the main system if at least one of the first data information fails to fulfill a corresponding preset reference range.

With regard to the apparatus in this embodiment, the specific ways for the various modules to implement the operations have been detailed in the embodiments about the method, which will not be elaborated herein.

It should be noted that various potential implementations of this embodiment may be exercised separately or, if without contradiction, in any combination, which will not be limited in the present application.

According to the vehicle fault handling apparatus of this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle. Moreover, a warning may be provided to timely remind relevant personnel to take safety measures, furthering the safety for the vehicle.

Embodiment 7

This embodiment provides a vehicle fault handling apparatus configured to implement the method according to the Embodiment 3.

Figure 5:
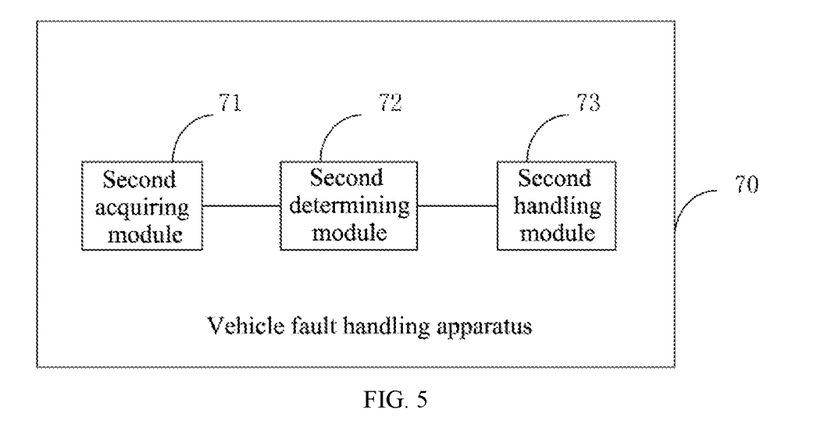
FIG. 5 is a structural diagram illustrating a vehicle fault handling apparatus provided in another embodiment of the present application.

FIG. 5 shows a structural diagram illustrating a vehicle fault handling apparatus provided in an embodiment of the present application. The vehicle fault handling apparatus 70 includes a second acquiring module 71, a second handling module 72 and a second handling module 73.

The second acquiring module 71 is configured for a second vehicle fault handling device to acquire in real-time status information of a first computing device, monitor a second computing device in real-time, where the second vehicle fault handling device is provided on the second computing device. The second determining module 72 is configured for the second vehicle fault handling device to determine whether a fault has occurred in the first computing device according to the status information thereof. The second handling module 73 is configured for the second vehicle fault handling device to control a driving status of the vehicle if a fault has occurred in the first computing device.

With regard to the apparatus in this embodiment, the specific ways for the various modules to implement the operations have been detailed in the embodiments about the method, which will not be elaborated herein.

According to the vehicle fault handling apparatus of this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle.

Embodiment 8

This embodiment provides supplementary explanation for the apparatus provided in Embodiment 7, aiming at implementing the method provided in Embodiment 4.

As a potential implementation, on the basis of the Embodiment 5, in an embodiment, the second handling module is specifically configured for the second vehicle fault handling device to control the vehicle to decelerate, stop or emergency brake if a fault has occurred in the first computing device.

In an embodiment, the status information of the first computing device includes heartbeat detecting information for the first computing device, and the second determining module is specifically configured to:

determine that a fault has occurred in the first computing device if the second vehicle fault handling device fails to acquire the heartbeat detecting information for the first computing device within a second preset time period.

As another potential implementation, on the basis of the Embodiment 5, in an embodiment, the second handling module is further configured for the second vehicle fault handling device to perform alert handling if a fault has occurred in the first computing device.

As yet another potential implementation, on the basis of the Embodiment 5, in an embodiment, the second acquiring module is further configured for the second vehicle fault handling device to acquire in real-time heartbeat detecting information and environment information for the second computing device; the second determining module is further configured for the second vehicle fault handling device to transmit the heartbeat detecting information and the environment information for the second computing device to a first vehicle fault handling device, and determine whether a fault has occurred in the second computing device according to the heartbeat detecting information and the environment information for the second computing device; and the second handling module is further configured for the second vehicle fault handling device to perform alert handling if a fault has occurred in the second computing device.

With regard to the apparatus in this embodiment, the specific ways for the various modules to implement the operations have been detailed in the embodiments about the method, which will not be elaborated herein.

It should be noted that various potential implementations of this embodiment may be exercised separately or, if without contradiction, in any combination, which will not be limited in the present application.

According to the vehicle fault handling apparatus of this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle. Moreover, a warning may be provided to timely remind relevant personnel to take safety measures, furthering the safety for the vehicle.

Embodiment 9

This embodiment provides a vehicle fault handling device configured to implement the vehicle fault handling method as provided in Embodiment 1 or Embodiment 2.

Figure 6:
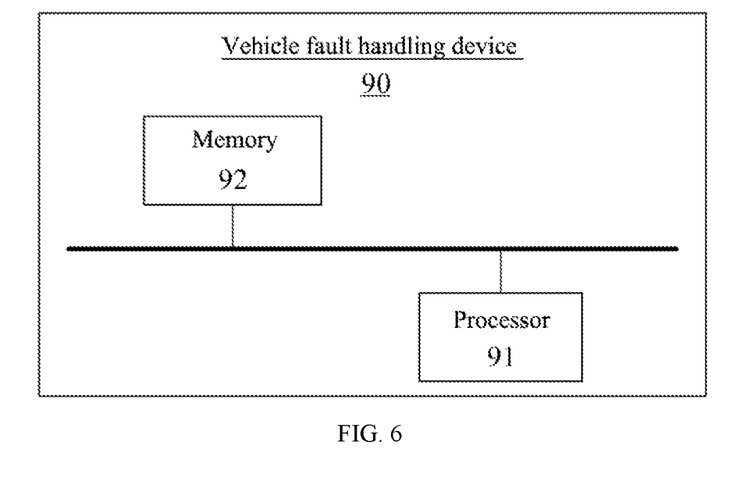
FIG. 6 is a structural diagram illustrating a vehicle fault handling device provided in an embodiment of the present application.

FIG. 6 shows a structural diagram illustrating a vehicle fault handling device provided in an embodiment of the present application. The vehicle fault handling is the aforementioned first vehicle fault handling device. The vehicle fault handling device 90 includes at least one processor 91 and a memory 92, where:

the memory 92 stores thereon computer program which is executed by the at least one processor 91 to implement the vehicle fault handling method as provided in the foregoing embodiments.

According to the vehicle fault handling device of this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle. Moreover, a warning may be provided to timely remind relevant personnel to take safety measures, furthering the safety for the vehicle.

Embodiment 10

This embodiment provides a vehicle fault handling device configured to implement the method as provided in Embodiment 3 or Embodiment 4.

Figure 7:
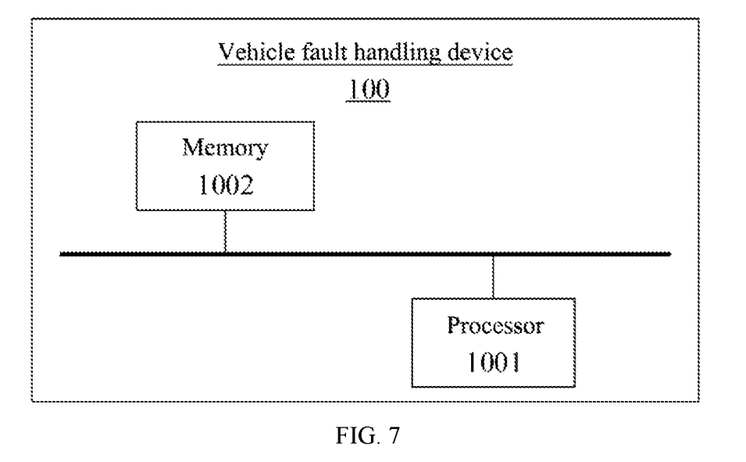
FIG. 7 is a structural diagram illustrating a vehicle fault handling device provided in another embodiment of the present application.

FIG. 7 shows a structural diagram illustrating a vehicle fault handling device provided in an embodiment of the present application. The vehicle fault handling is the aforementioned second vehicle fault handling device. The vehicle fault handling device 100 includes a processor 1001 and a memory 1002, where:

the memory 1002 stores thereon computer program which is executed by the processor 1001 to implement the method as provided in the Embodiment 3 or Embodiment 4.

According to the vehicle fault handling device of this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle. Moreover, a warning may be provided to timely remind relevant personnel to take safety measures, furthering the safety for the vehicle.

Embodiment 11

This embodiment provides a computer readable storage medium, storing thereon a computer program which, when executed, implements the method as provided in Embodiment 1 or Embodiment 2.

According to the computer readable storage medium of this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle. Moreover, a warning may be provided to timely remind relevant personnel to take safety measures, furthering the safety for the vehicle.

Embodiment 12

This embodiment provides a computer readable storage medium, storing thereon a computer program which, when executed, implements the method as provided in Embodiment 3 or Embodiment 4.

According to the computer readable storage medium of this embodiment, a first vehicle fault handling device is provided in a first computing device of a vehicle to monitor a main system of the vehicle in real-time, so as to avoid safety hazards that can potentially be caused by fault in a main system of the vehicle, effectively enhancing safety for the unmanned vehicle. Also, a redundant computing device is provided on the vehicle, and redundant vehicle fault handling devices are built on two computing devices, so as to discover and callback faults. Moreover, the two vehicle fault handling devices may monitor each other, enhancing the robustness of the unmanned system while improving the safety for the unmanned vehicle. Moreover, a warning may be provided to timely remind relevant personnel to take safety measures, furthering the safety for the vehicle.

In the embodiments provided in the present application, it should be understood that the disclosed apparatus and method may be implemented by other means. For instance, the apparatus embodiments described above are merely illustrative. For instance, the units are separated by their logical functions only, and other separations are possible in practical implementation. For instance, multiple units or components may be combined, or be integrated with another system, or some features may be omitted or skipped. In addition, the inter-couplings illustrated or discussed, whether a direct coupling or communication connection, may be an indirect coupling or communication connection via some kind of interface, apparatus or unit, and may be electrical, mechanical or otherwise.

The units described as separate components may or may not be physically separated, and the components displayed as a unit may or may not be a physical unit, that is, they may be located at one place, or may be distributed to multiple network elements. Some or all of the units may be selected according to actual needs to achieve the purpose of the solution of the embodiments.

In addition, various functional units in various embodiment of the present application may be integrated into a single processing unit, or be physically separated into stand-alone units, or two or more units may be integrated into one unit. The above integrated unit may be implemented in the form of hardware or in the form of hardware plus a software functional unit.

The integrated unit implemented in the form of the software functional unit as described above may be stored in a computer readable storage medium. The software functional unit described above may be stored in a storage medium and include instructions for causing a computing device (which may be a personal computer, a server, or a network device, etc.) or a processor to implement some of the steps in the methods of the various embodiments of the present application. The storage medium includes: a USB thumb, a portable hard disk, a read-only memory (ROM), a random access memory (RAM), a magnetic disk, or an optical disk, and the like, which may store program codes.

A person skilled in the art may clearly understand that the division of the functional modules described above merely serves as illustrative examples for the convenience and brevity of the descriptions, and in practical applications, the above functions may be assigned to different functional modules as needed. That is, the internal structure of the apparatus may be partitioned into different functional modules to accomplish all or part of the functions described above. For the specific operating process of the apparatuses described above, reference may be made to the corresponding processes in the foregoing method embodiments, which will not be repeated herein.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

The invention claimed is:

1. A vehicle fault handling method, comprising:
   acquiring in real-time, by a first vehicle fault handling device, status information of a second vehicle fault handling device, wherein the first vehicle fault handling device is further configured to monitor a main system of a vehicle in real-time, the second vehicle fault handling device is configured to monitor a first computing device, and the first vehicle fault handling device and the main system are provided in the first computing device;
   determining, by the first vehicle fault handling device, whether a fault has occurred in the second vehicle fault handling device according to the status information of the second vehicle fault handling device; and
   performing, by the first vehicle fault handling device, fault handling if a fault has occurred in the second vehicle fault handling device,
   wherein the status information of the second vehicle fault handling device comprises heartbeat detecting information for the second vehicle fault handling device, and
   the determining, by the first vehicle fault handling device, whether a fault has occurred in the second vehicle fault handling device according to the status information of the second vehicle fault handling device comprises:
      determining that a fault has occurred in the second vehicle fault handling device if the first vehicle fault handling device fails to acquire the heartbeat detecting information for the second vehicle fault handling device within a first preset time period,
   wherein the status information of the second vehicle fault handling device further comprises environment information for the second vehicle fault handling device, and
   the determining, by the first vehicle fault handling device, whether a fault has occurred in the second vehicle fault handling device according to the status information of the second vehicle fault handling device comprises:
      determining, by the first vehicle fault handling device, whether a fault has occurred in the second vehicle fault handling device according to the environment information for the second vehicle fault handling device if the first vehicle fault handling device determines that no fault has occurred in the second vehicle fault handling device according to the heartbeat detecting information for the second vehicle fault handling device,
   wherein the first vehicle fault handling device monitors the main system of a vehicle in real-time comprises:
      acquiring in real-time, by the first vehicle fault handling device, first data information of the main system;
      determining, by the first vehicle fault handling device, whether a fault has occurred in the main system according to the first data information; and
      controlling, by the first vehicle fault handling device, the vehicle to decelerate or stop if a fault has occurred in the main system;
   wherein the first data information comprises at least one of frequency information, latency information, heartbeat detecting information, collision detecting information, chassis acquisition information, assisted autopilot process information, security gateway monitoring information, first computing device environment information, and
      the determining, by the first vehicle fault handling device, whether a fault has occurred in the main system according to the first data information comprises:
      determining that a fault has occurred in the main system if at least one of the first data information fails to fulfill a corresponding preset reference range, and
   wherein the latency information comprises information about a latency in the main system from spotting an obstacle to issuing a command to dodge the obstacle.

2. The method according to claim 1, wherein the performing, by the first vehicle fault handling device, fault handling if a fault has occurred in the second vehicle fault handling device comprises:
   performing, by the first vehicle fault handling device, alert handling if a fault has occurred in the second vehicle fault handling device.

3. A non-transitory computer readable storage medium, storing thereon a computer program which, when executed, implements the method according to claim 1.

4. The method according to claim 1, wherein the environment information for the second vehicle fault handling device comprises information about at least one of CPU usage and memory usage of the second vehicle fault handling device.

5. A vehicle fault handling apparatus, comprising at least one processor and a memory, wherein:
   the memory stores thereon computer program which is executed by the at least one processor to:
   acquire in real-time status information of a second vehicle fault handling device, monitor a main system of a vehicle, the second vehicle fault handling device is configured to monitor a first computing device, and the first vehicle fault handling device and the main system are provided in the first computing device;
   determine whether a fault has occurred in the second vehicle fault handling device according to the status information of the second vehicle fault handling device; and
   perform fault handling if a fault has occurred in the second vehicle fault handling device,
   wherein the status information of the second vehicle fault handling device comprises heartbeat detecting information for the second vehicle fault handling device, and the memory further stores thereon computer program which is executed by the at least one processor to:
   determine that a fault has occurred in the second vehicle fault handling device if the first vehicle fault handling device fails to acquire the heartbeat detecting information for the second vehicle fault handling device within a first preset time period, and
   wherein the status information of the second vehicle fault handling device further comprises environment information for the second vehicle fault handling device, and the memory further stores thereon computer program which is executed by the at least one processor to determine whether a fault has occurred in the second vehicle fault handling device according to the environment information for the second vehicle fault handling device if the first vehicle fault handling device determines that no fault has occurred in the second vehicle fault handling device according to the heartbeat detecting information for the second vehicle fault handling device, wherein the memory further stores thereon computer program which is executed by the at least one processor to:

acquire in real-time first data information of the main system;

determine whether a fault has occurred in the main system according to the first data information; and control the vehicle to decelerate or stop if a fault has occurred in the main system;

wherein the first data information comprises at least one of frequency information, latency information, heartbeat detecting information, collision detecting information, chassis acquisition information, assisted autopilot process information, security gateway monitoring information, first computing device environment information, and the memory further stores thereon computer program which is executed by the at least one processor to:

determine that a fault has occurred in the main system if at least one of the first data information fails to fulfill a corresponding preset reference range, and wherein the latency information comprises information about a latency in the main system from spotting an obstacle to issuing a command to dodge the obstacle.

6. The apparatus according to claim 5, wherein the memory further stores thereon computer program which is executed by the at least one processor to perform alert handling if a fault has occurred in the second vehicle fault handling device.

7. The apparatus according to claim 5, wherein the environment information for the second vehicle fault handling device comprises information about at least one of CPU usage and memory usage of the second vehicle fault handling device.

* * * * *